Dec. 17, 1963    M. H. DAVIS    3,114,271
DRIVEN VARIABLE PITCH PULLEY
Filed Oct. 4, 1961

INVENTOR.
MARION H. DAVIS
BY
Lockwood, Woodard, Smith & Weikart
Attorneys

United States Patent Office 3,114,271
Patented Dec. 17, 1963

3,114,271
DRIVEN VARIABLE PITCH PULLEY
Marion H. Davis, 550 W. Main St., Hagerstown, Ind.
Filed Oct. 4, 1961, Ser. No. 142,903
5 Claims. (Cl. 74—230.17)

This invention relates to pulleys in belt drives and particularly to a variable pitch pulley for incorporation as the driven pulley in a belt drive.

For many years, much work has been done in the area of belt drives whereby the pitch diameters of the drive pulley and driven pulley are varied in order to provide the most effective transmission of power. The intention has been to provide a relatively small pitch diameter on the driving pulley and relatively large pitch diameter on the driven pulley when the load on the driven pulley is comparatively high, such as under starting conditions. As the load decreases and speed increases, it is desirable to increase the pitch diameter of the driving pulley and decrease the diameter of the driven pulley. Many devices have been produced to accomplish this effect, and one which is particularly well suited to employment as a driving pulley is that shown in my Patent 2,928,286 issued March 15, 1960.

Many devices have been produced for use in the driven pulley application but have generally been rather complicated and expensive, not only to manufacture but also to maintain. Moreover, they have lubrication problems. Excess oil or grease on the splines works out between pulley halves and gets on the belt. In addition, few of these units have had the facility to operate at an infinite number of pitch diameters between the maximum and minimum, most being operable at one or another pitch diameter.

Efforts to produce a really efficient, inexpensive, trouble-free and infinitely variable pitch driven pulley have heretofore had little success. One particular difficulty encountered is attributable to the fact that when the driven pulley must operate at its maximum pitch diameter such as under starting conditions or other low-speed, high-load conditions, the pull on the belt will usually be the highest. This means that the force tending to hold the driven pulley halves together must be the greatest available from the means controlling separation of the pulley halves. Obviously, therefore, since this requirement is a requirement which must be met at the low pulley speed, centrifugal devices are not suitable. This can be particularly well recognized when it is observed that the high-speed, low-load condition does not require so great a force tending to move the driven pulley halves together.

It is, therefore, a general object of this invention to provide an improved variable pitch pulley particularly adapted to application as a belt driven pulley.

Another object of this invention is to provide a belt driven pulley having a continuously variable pitch diameter.

A further object of this invention is to provide a variable pitch pulley incorporating pulley halves with means for providing variable spacing therebetween to vary the pitch diameter thereof and wherein said means are capable of providing a higher force tending to reduce the space between the pulley halves at greater pitch diameters of the pulley than they provide at lesser pitch diameters of the pulley.

It is a still further object of this invention to provide a driven variable pitch pulley accomplishing the foregoing object and having no lubrication problems.

It is a still further object of this invention to provide a driven pulley accomplishing the foregoing objects and having the maximum simplicity of construction, minimal expense of construction and maintenance, trouble-free operation, and exceptionally long life.

In a typical embodiment of this invention, a driven pulley is provided having a power transmitting member which may be fastened to a device to be driven such as a drive wheel of a vehicle. This member has a pulley face thereon with an axis of symmetry. An intermediate member is mounted on the power transmitting member and has a pulley face similar to and facing that of the power transmitting member and is movable thereon to provide variable spacing between the pulley faces. A cam surface is provided on the side of the intermediate member remote from its pulley face. A shoulder member which may be an end flange mounted on the power transmitting member, has a cam surface facing the cam surface of the intermediate member.

A garter spring is received between the two cam surfaces and is supported thereby in tension, thereby providing an axial force component biasing the pulley faces toward each other. The cam surfaces are convex in form so that by the cam action, or advantage angle, the axial component of the spring force is multiplied whereby the garter spring can provide an increasing axial force component (biasing force) as the pulley operates at increasing pitch diameters, to handle higher loads.

The full nature of the invention will be understood from the accompanying drawings and the following description and claims.

Figure 1:
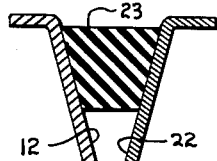
FIG. 1 is a partial longitudinal cross section of a typical embodiment of variable pitch pulley of this invention showing the pulley in a high pitch diameter condition.

Referring to FIG. 1, a power transmitting member 11 is shown having a pulley face 12 thereon which may be symmetrical about the axis 13. Member 11 is shown mounted to a sleeve 14 and fastened in place thereon by a setscrew 16. A chain sprocket 17 is fastened by bolts 18 to member 11.

Figure 5:
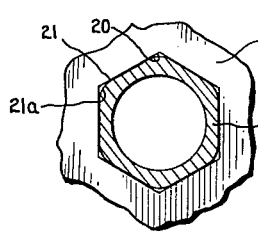
FIG. 5 is a fragmentary cross section illustrating the mounting of the axially movable pulley member.

An intermediate member 19 is mounted on sleeve 14 and is movable axially thereon. Its rotational position with respect to sleeve 14 is fixed, preferably by provision of a bore 20 of hexagonal cross section in member 19 and a matching exterior surface 21 of generally hexagonal cross section on sleeve 14. The corners of the hex on the sleeve are rounded as shown at 21a in FIG. 5 whereby the bearing area between the bore 20 and surface 21 is small enough to develop adequate pressure to crush foreign particles. Yet the bearing area is large enough to avoid the necessity of lubrication.

While the embodiment shown gives excellent results, other polygonal cross sectional forms may be used, or conventional splines may be used, the latter usually requiring lubrication. The intermediate member has a pulley face 22 thereon facing pulley face 12. Belt 23 is shown in operating position between the pulley faces.

A curved convex cam surface 24 is shown on intermediate member 19 and faces generally in the direction opposite that faced by pulley face 12. A shoulder member 26 is mounted on sleeve 14 and fastened thereto by setscrew 27. The shoulder member has a curved convex cam surface 28 thereon facing the cam surface 24 of the intermediate member.

A resilient member 29, which may most conveniently be made of a coiled garter spring, is received between and supported by the cam surfaces on the intermediate member and the shoulder. The garter spring in this position is stretched to provide a force against the cam surfaces tending to separate them and accordingly, providing a bias tending to force the pulley faces together. Thus, an adequate force is available to maintain the belt 23 at the high pitch radius shown.

Figure 2:
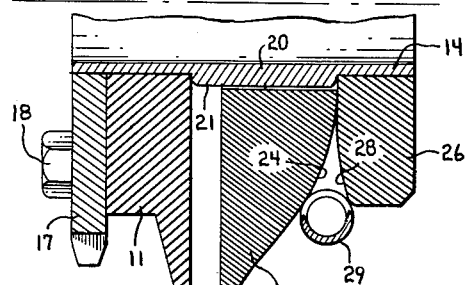
FIG. 2 is a partial longitudinal cross section of the embodiment of this invention shown in FIG. 1, illustrating the pulley in a low pitch diameter condition.

In FIG. 2, representing the low-pitch diameter condition of the pulley, it will be observed that the garter spring 29 is radially removed from the axis 13 farther than it was in FIG. 1. This is, of course, because the belt is operating closer to axis 13. At first, it would appear that because the garter spring is at a greater radius than in FIG. 1, the force tending to bias face 22 toward face 12 would be greater than in FIG. 1. However, this is not the case. Because of the convex shape of the cam surface, the mechanical advantage of the spring 29 as a wedge between the cam surfaces is not as great at the greater radii than at lesser radii with respect to axis 13. In other words, the axial or horizontal component of the radial force exerted by spring 29 decreases at a more rapid rate than the increase in radial force as the spring moves outwardly. The convex shape of the cam surface more than offsets the increased force radially inwardly applied by spring 29 at the greater radius. Consequently, the effect achieved by the garter spring is exactly what is desired by virtue of the novel employment of the cam surfaces, i.e. a greater force biasing the face 22 toward face 12 is available when the faces are closer together than when they are farther apart. Thus, the greatest biasing force is available in the high-load, low-speed condition when the pull on the belt will be greatest.

Figure 3:
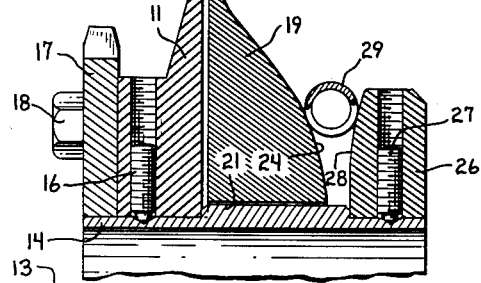
FIG. 3 is a partial longitudinal section of another embodiment of this invention showing the pulley in a high pitch diameter condition.
Figure 4:
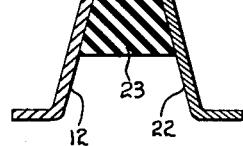
FIG. 4 is a partial longitudinal section of the embodiment of FIG. 3 showing the pulleys in a low-pitch diameter condition.

FIGS. 3 and 4 illustrate an optional construction. In these figures, parts corresponding to parts in FIGS. 1 and 2 bear the same reference numerals as in FIGS. 1 and 2. A gear 40 has been substituted for the sprocket 17 and a shaft 30 is shown carrying member 11. It should be observed that the cam surfaces are convex in nature though not of a curved convex form. They are instead crowned as at ridge 25 between conical portions 24a and 24b on intermediate member 19, such that instead of providing continuously variable pitch diameters, two principal pitch diameters are available, one for low speed and one for high speed. FIGS. 3 and 4 also show an optional feature of construction of the unit whereby the intermediate member 19 is splined directly to the power transmitting member 11.

In the operation of the invention, assume that a driving variable pitch pulley mounted to an engine is operating at its minimum pitch diameter under a load starting condition. This will permit the garter spring to move from the position shown in FIG. 2 to that shown in FIG. 1 whereupon the belt will be grasped firmly between the pulley faces of my invention at its maximum pitch diameter. As the load is placed under way or accelerated, the engine speed can increase and the variable pitch drive pulley mounted thereto will increase in pitch diameter. This reduces the amount of the belt length available in the driven pulley thus opposing the biasing force applied by the garter spring and separating the driven pulley faces thereof just enough to compensate for this reduction. This process continues until the engine mounted driving pulley achieves its maximum pitch diameter, at which time the continued separation of the driven pulley faces will cease. The driven pulley faces and the garter spring will then be in the position shown in FIG. 2 with the spring supplying just enough biasing force to grip the belt adequately for the comparatively low friction required to transmit the load.

If the load tends to increase such as would be the case in a motor scooter encountering an uphill change of grade, the engine speed would be decreased and the engine mounted drive pulley pitch diameter would decrease. This would provide a momentary loosening of the belt and the garter spring would immediately compensate by moving the pulley faces together to again firmly grip the belt. While these functions are described, step by step, it should be understood that they take place instantaneously without loss of power or any slipping sensation to the operator. As the garter spring assumes a smaller diameter, its mechanical advantage in biasing the pulley faces toward each other increases by virtue of the contour of the cam surfaces. The pulley can thus handle the comparatively high, uphill load condition.

The utility of this invention will be better appreciated when one considers the necessity of a highly efficient drive for a comparatively low powered, heavily loaded vehicle such as a scooter, fun car, or golf cart. These vehicles have a comparatively low power to weight ratio, and consequently various power transmission ratios are essential to an effective vehicle. A continuously variable transmission ratio is the ultimate and is provided by the combination of this invention with the automatic clutch and transmission shown in my aforementioned patent, tailored to the torque curve of the engine. They provide not only a low cost, simple, durable, trouble-free and light weight unit but also provide the continuously variable transmission ratio desired.

The aforementioned advantages may also be appreciated in the application of my invention to a vehicle having a high power-to-weight ratio, such as a go-cart, where the most effective transmission of power is essential to a competitive machine.

It will be recognized, of course, that this invention is not only highly advantageous in the go-cart application but will also be readily employed in a variety of other applications such as, for example, agricultural equipment, motorcycles, amusement park rides and garden machinery. It should also be understood that while the specification mentioned a separate sprocket bolted to the power transmitting member, a sleeve and power transmitting member fastened together by a setscrew, or an integral power transmitting member and sleeve, many other variations could be employed which would be within the scope of this invention. For example, the shoulder member could be integral with the sleeve, or the power transmitting member could be bolted to an axial shaft flange, to a pulley, to a gear or bolted directly to a drive wheel obviating the use of a sleeve. Moreover, resilient means other than a coiled garter spring could be employed. Furthermore a variety of pulley driving arrangements may be used with this invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A variable pitch pulley comprising: a power transmitting member for connection to a device to be driven by the pulley, said member having a first pulley face thereon with an axis of symmetry; an intermediate member mounted on said transmitting member and having a second pulley face thereon coaxial with and facing said first face, said intermediate member being axially movable on said transmitting member to vary the spacing between said faces and thereby vary the pitch diameter of said pulley, said intermediate member having a first surface thereon facing in a direction opposite the facing direction of said second pulley face; a shoulder member on said transmitting member and having a second surface thereon facing said first surface, one of said surfaces being a cam surface; and resilient garter means received between said surfaces and engaging said surfaces to bias said second pulley face toward said first pulley face, said cam surface having a slope which increases at decreasing radial distances from the said axis to increase the force of said bias as spacing between said pulley faces decreases and decrease tension in said resilient garter means as spacing between said pulley faces decreases.

2. A variable pitch pulley comprising: a power transmitting member for connection to a device to be driven by the pulley, said member having a first pulley face thereon with an axis of symmetry; an intermediate member mounted on said transmitting member and having a second pulley face thereon coaxial with and facing said first face, said intermediate member being axially movable on said transmitting member to vary the spacing between said faces and thereby vary the pitch diameter of said pulley, said intermediate member having a curved convex cam surface thereon coaxial with said pulley faces and facing in a direction opposite the facing direction of said second pulley face; a shoulder member on said transmitting member and having a curved convex cam surface thereon facing said cam surface; and a garter spring received between said surfaces and engaging said surfaces to bias said second pulley face toward said first pulley face, both of said cam surfaces having slopes which continuously increase at decreasing radial distances from said axis, to promote radially inward sliding of said garter spring on said cam surfaces as the spacing between said pulley faces decreases and to promote reduction of tension in said garter spring during said sliding, and to increase the axial force required to move said second pulley face away from said first pulley face as the spacing between said pulley faces decreases.

3. A variable pitch pulley comprising: a power transmitting member for connection to a device to be driven by the pulley, said member having a first pulley face thereon with an axis of symmetry; an intermediate member mounted on said transmitting member and having a second pulley face thereon coaxial with and facing said first face, said intermediate member being axially movable on said transmitting member to vary the spacing between said faces and thereby vary the pitch diameter of said pulley, said intermediate member having a first crowned convex cam surface thereon facing in a direction opposite the facing direction of said second pulley face; a shoulder member on said transmitting member and having a second crowned convex cam surface thereon coaxial with and facing said first surface; and a garter spring received between said surfaces and engaging said surfaces to bias said second pulley face toward said first pulley face, said cam surfaces having slopes which increase at decreasing radial distances from the said axis to increase the force of said bias as spacing between said pulley faces decreases and decrease tension in said garter spring as spacing between said pulley faces decreases.

4. A variable pitch pulley comprising: a power transmitting member for connection to a device to be driven by the pulley, said member having a first pulley face thereon with an axis of symmetry; an intermediate member monuted on said transmitting member and having a second pulley face thereon coaxial with and facing said first face, said intermediate member being axially movable on said transmitting member to vary the spacing between said faces and thereby vary the pitch diameter of said pulley, said intermediate member having a first convex cam surface thereon coaxial with said second face and facing in a direction opposite the facing direction of said second pulley face; a shoulder member on said transmitting member and having a second convex cam surface thereon coaxial with and facing said first cam surface; and a garter spring received between and supported by said cam surfaces and engaging said surfaces to bias said second pulley face toward said first pulley face, said cam surfaces having slopes which increase at decreasing radial distances from the said axis to increase the force of said bias as spacing between said pulley faces decreases and decrease tension in said garter spring as spacing between said pulley faces decreases.

5. In a variable pitch pulley, means for accommodating relative axial movement between parts and preventing relative rotational movement between said parts and comprising, a first part having a bore therethrough of a generally polygonal cross section, and a second part having an exterior surface of a matching generally polygonal cross section fittingly received in said bore, the corners of the polygon of the second part being rounded sufficiently to reduce the contact area between said bore and said exterior surface to establish foreign particle crushing to minimize the effect of foreign particles on relative axial movement between said parts.

References Cited in the file of this patent
UNITED STATES PATENTS

| | | |
|---|---|---|
| 1,797,223 | Annis | Mar. 24, 1931 |
| 2,892,354 | Amonsen | June 30, 1959 |
| 2,916,926 | Albertson | Dec. 15, 1959 |
| 3,010,333 | Rampe | Nov. 28, 1961 |